US012637208B1

(12) United States Patent
Luo

(10) Patent No.: US 12,637,208 B1
(45) Date of Patent: May 26, 2026

(54) MOTOR MOUNT FOR SEPARATE TYPE MOTOR OF LARGE MULTICOPTER

(71) Applicant: East Field Corporation, Taoyuan City (TW)

(72) Inventor: Chieh Luo, Taoyuan City (TW)

(73) Assignee: EAST FIELD CORPORATION, Taoyuan City (TW)

( * ) Notice: Subject to any disclaimer, the term of this patent is extended or adjusted under 35 U.S.C. 154(b) by 0 days.

(21) Appl. No.: 19/258,101

(22) Filed: Jul. 2, 2025

(51) Int. Cl.
*B64C 27/32* (2006.01)

(52) U.S. Cl.
CPC ..................................... *B64C 27/32* (2013.01)

(58) Field of Classification Search
CPC ...................................................... B64C 27/32
See application file for complete search history.

(56) References Cited

U.S. PATENT DOCUMENTS

| | | | | |
|---|---|---|---|---|
| 10,711,941 | B1 * | 7/2020 | Sura ........................ | F16M 11/22 |
| 10,805,540 | B2 * | 10/2020 | Van Niekerk .......... | B64U 10/14 |
| 11,454,280 | B2 * | 9/2022 | Thompson .............. | B64C 11/06 |
| 12,063,926 | B2 * | 8/2024 | Wynalda, Jr. ......... | A01M 31/02 |
| 2016/0116828 | A1 * | 4/2016 | Clearman ........... | G03B 17/566 |
| | | | | 396/428 |
| 2016/0229530 | A1 * | 8/2016 | Welsh ..................... | B64U 30/24 |
| 2017/0305542 | A1 * | 10/2017 | Zhang .................... | B64U 30/26 |
| 2021/0024204 | A1 * | 1/2021 | Chen ...................... | B64U 50/19 |

FOREIGN PATENT DOCUMENTS

| | | | | |
|---|---|---|---|---|
| JP | 7522857 | B2 * | 7/2024 | ............. B64C 27/48 |
| JP | 2024164557 | A * | 11/2024 | ........... B64U 30/297 |
| WO | WO-2019210501 | A1 * | 11/2019 | ........... B64U 30/293 |
| WO | WO-2020102933 | A1 * | 5/2020 | ............... H01Q 1/28 |

* cited by examiner

*Primary Examiner* — Justin M Benedik
(74) *Attorney, Agent, or Firm* — Birch, Stewart, Kolasch & Birch, LLP

(57) ABSTRACT

A motor mount for separate type motor of large multicopter, includes: lower mount and upper mount. The upper mount and the lower mount are combined by the concave slide groove and the convex slide rail, and then quickly combined and positioned by the latch through holes, and the latch. Therefore, the present invention has the effect of making it more convenient to replace the motor or the motor mount. Since the lower mount of the present invention is in a double-inclined shape, the overall flight airflow is smoother and more stable.

5 Claims, 8 Drawing Sheets

MOTOR MOUNT FOR SEPARATE TYPE MOTOR OF LARGE MULTICOPTER

BACKGROUND OF THE INVENTION

1. Field of the Invention

An invention relates to a motor mount for separate type motor of large multicopter, especially to one that has the motor mount designed to be separated into a lower mount and an upper mount, and then quickly combined and positioned through a latch through hole and a latch.

2. Description of the Related Art

In order to improve the flight performance and controllability of large multicopter, the motor is sometimes replaced, or the motor mount with an inclined surface is used to allow the motor to be tilted. The conventional design is to first combine the motor with the motor mount, and then combine the motor mount with the body of the large multicopter. Whether replacing the motor or the motor mount, both the motor and the motor mount must be disassembled, which is inconvenient.

SUMMARY OF THE INVENTION

A primary objective of the present invention is to provide a motor mount for separate type motor of large multicopter, which improves the changing of both the motor and the motor mount.

In order to achieve the above objective, the present invention includes: a lower mount, a bottom surface of the lower mount is a horizontal surface, which is used to be combined with a body of an aircraft, the top surface of the lower mount is a joint surface, the joint surface forms a first inclination ($\theta1$) from the back to the front and also forms a second inclination ($\theta2$) from the left and right sides, so that the joint surface presents the inclination of the first and second directions at the same time, and a convex slide rail is provided on both sides of the joint surface; an upper mount, the upper mount is combined with the lower mount, a motor of the aircraft is combined with the upper mount, and the upper mount has a concave slide groove that can be combined with the convex slide rails on the two sides of the lower mount, so that the upper mount is embed and assembled on the joint surface of the lower motor from the rear side of the lower motor; and the side edges of the upper mount and the lower mount are respectively provided with corresponding latch through holes; and a latch set through the latch through holes to position the upper mount above the lower mount.

Also, a body of the aircraft is designed in polygonal shape, the lower mount is provided at each end corner, and the left and right sides of each adjacent lower mount are inclined in opposite directions, forming a staggered configuration in which one is inclined to the left and the other is inclined to the right.

Also, a body of the aircraft is designed in octagonal shape, provided with eight lower mounts, and the left and right sides of each adjacent lower mount are inclined in opposite directions.

Also, the lower mount is fixed on the body by a plurality of screws.

Also, the motor is provided with a rotating shaft, and a rotary wing is locked on the rotating shaft through a combined cover.

With the features disclosed above, the present invention has the effects of easily changing the motor or motor mount. Moreover, the inclination directions of the left and right sides of each adjacent lower mount are opposite, so that the rotating airflows of the rotary wing will not interfere with each other, and because the lower mount is in a double-inclined shape, the overall flight airflow is smoother and more stable.

DETAILED DESCRIPTION OF THE PREFERRED EMBODIMENT

Figure 1:
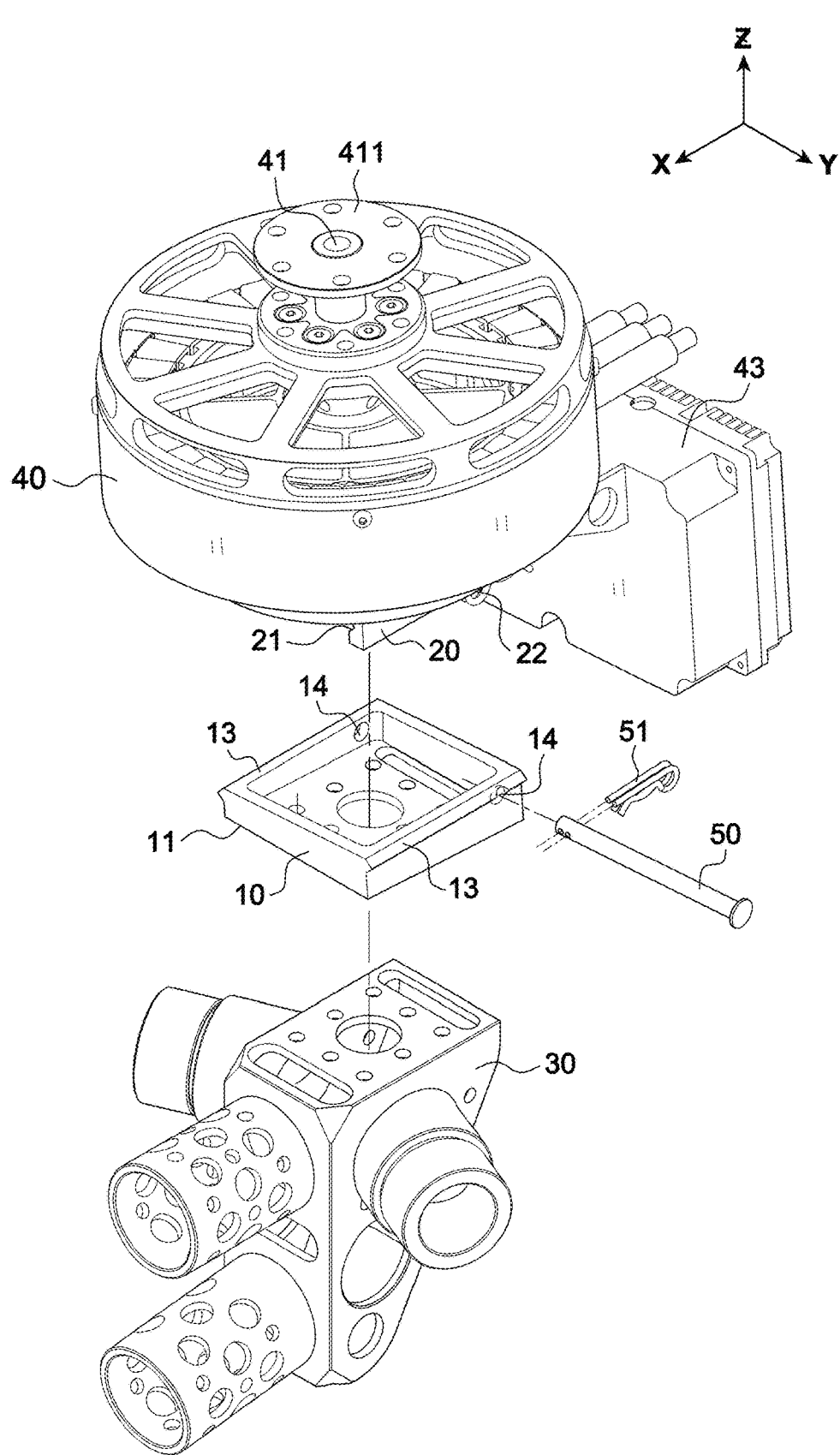
FIG. 1 is an exploded prospective view of a preferred embodiment of the present invention.
Figure 2A:
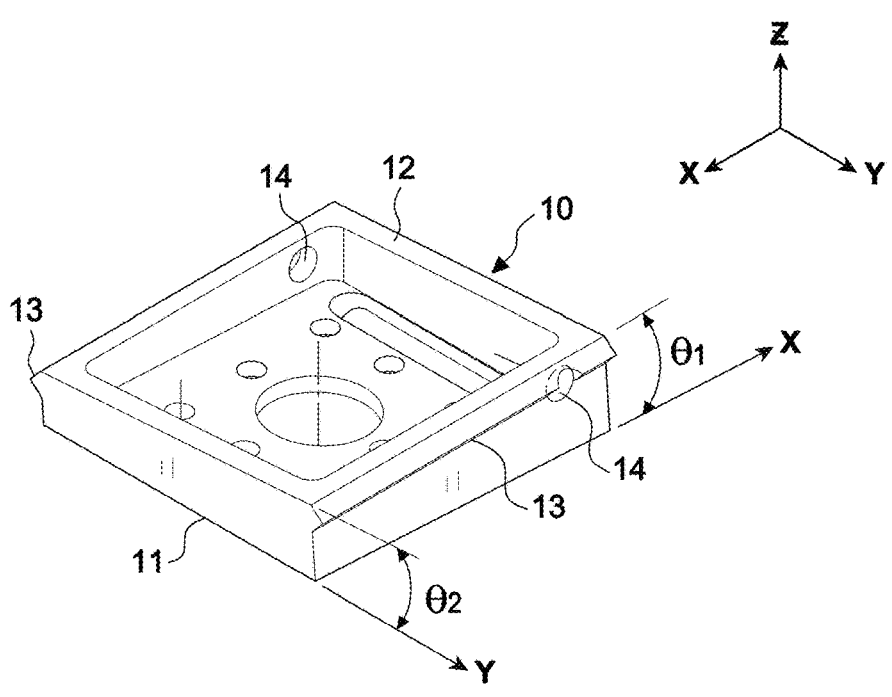
FIG. 2A is a prospective view of the lower mount of the present invention.
Figure 2B:
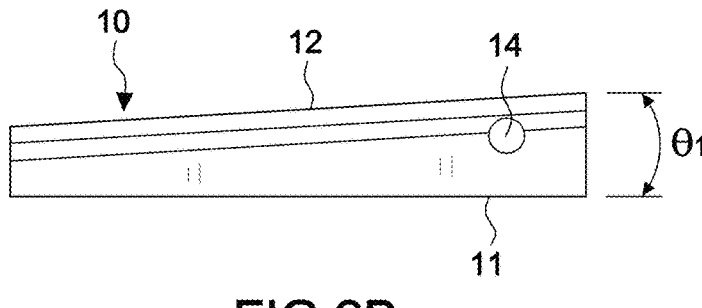
FIG. 2B is a side view of the lower mount of the present invention.
Figure 2C:
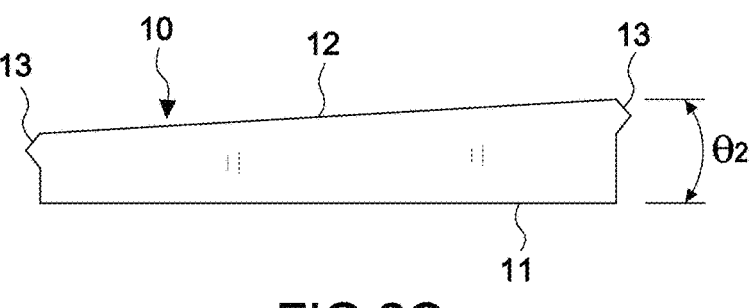
FIG. 2C is a front view of the lower mount of the present invention.
Figure 3:
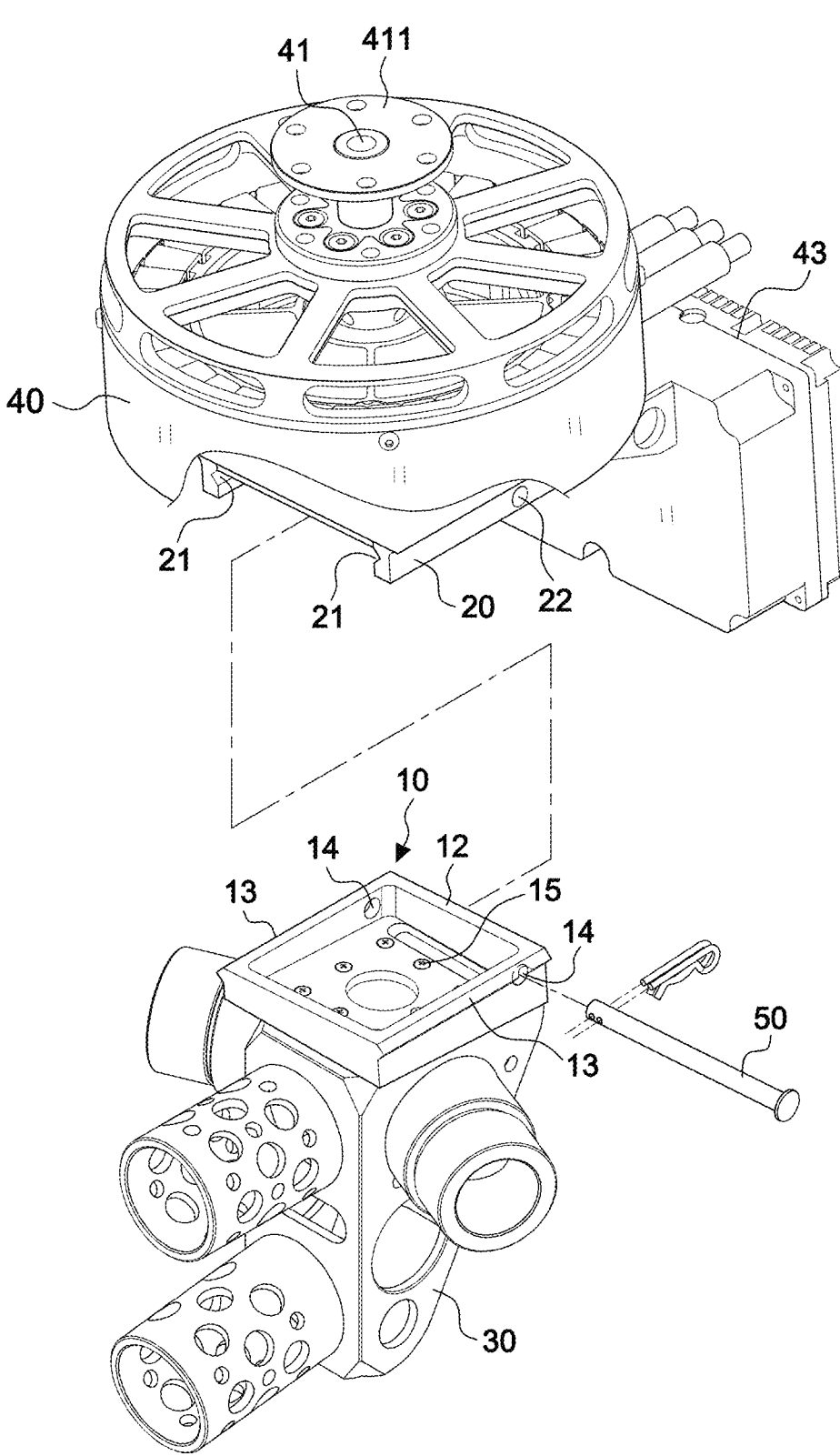
FIG. 3 is an exploded prospective view of the upper mount of the present invention.
Figure 4:
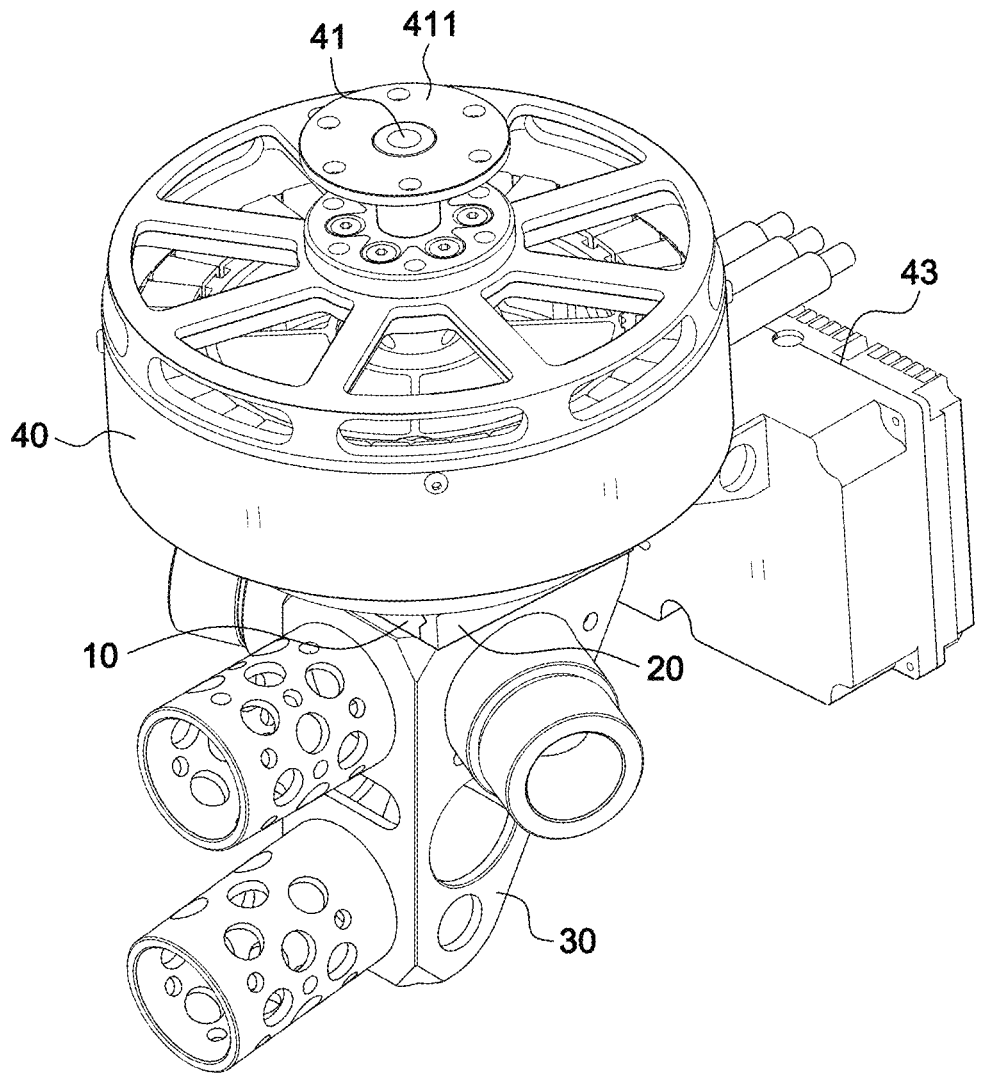
FIG. 4 is an assembly prospective view of a preferred embodiment of the present invention.
Figure 5A:
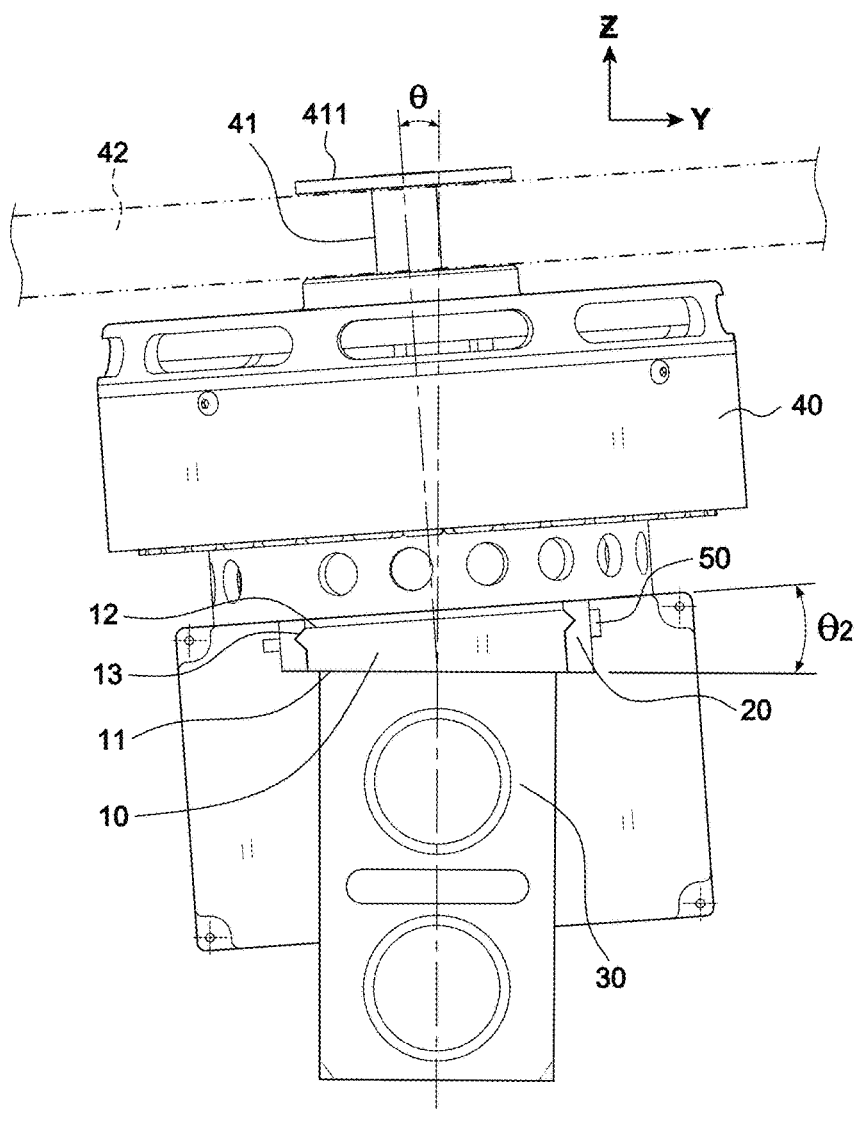
FIG. 5A is a front view of a preferred embodiment of the present invention.
Figure 5B:
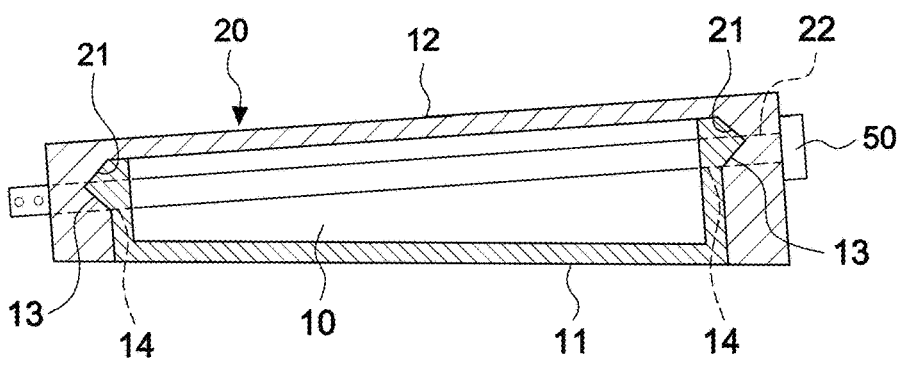
FIG. 5B is a zoom in view of the 5B in FIG. 5A.
Figure 6:
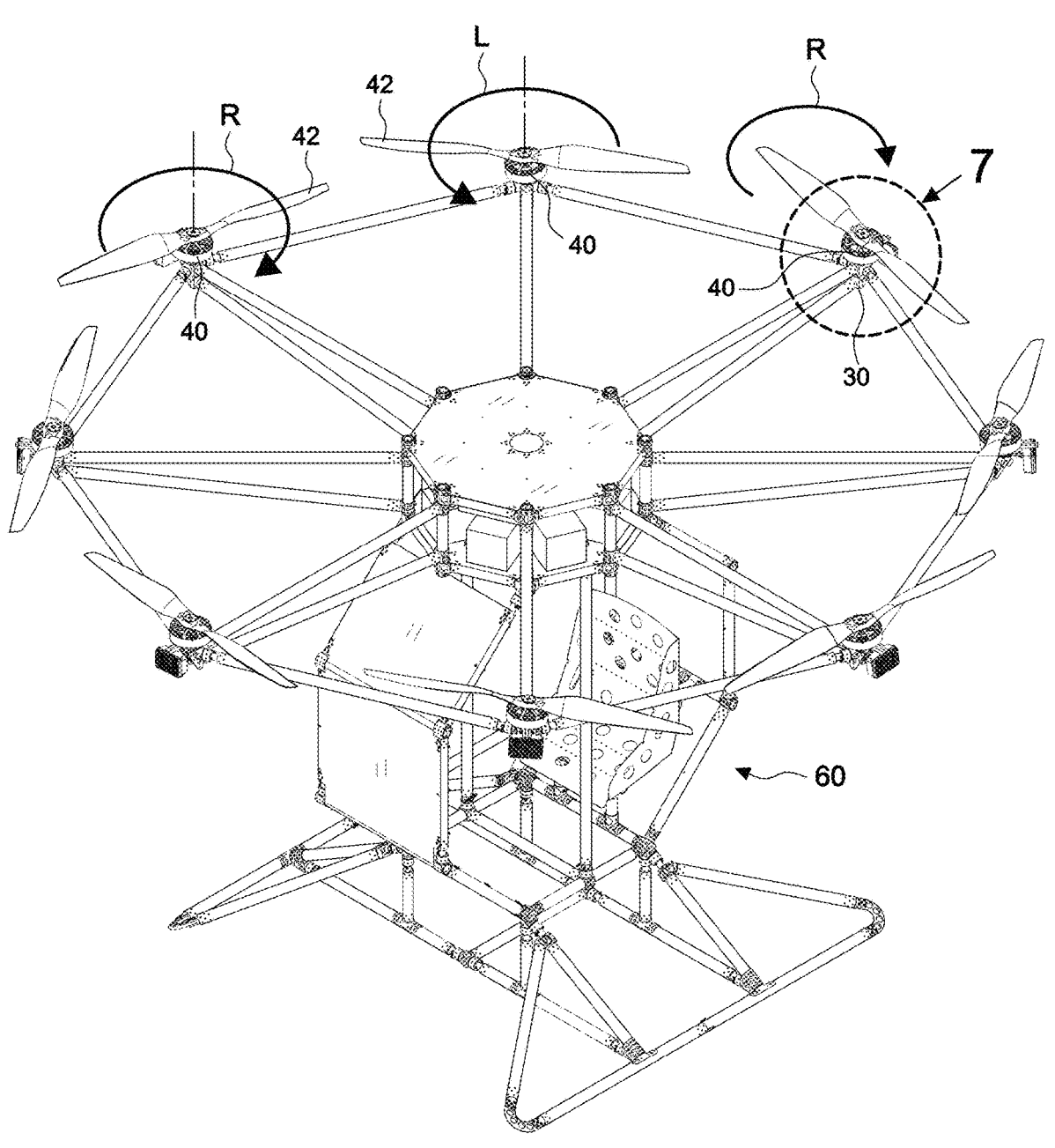
FIG. 6 is a schematic diagram illustrating the usage state of the present invention.
Figure 7:
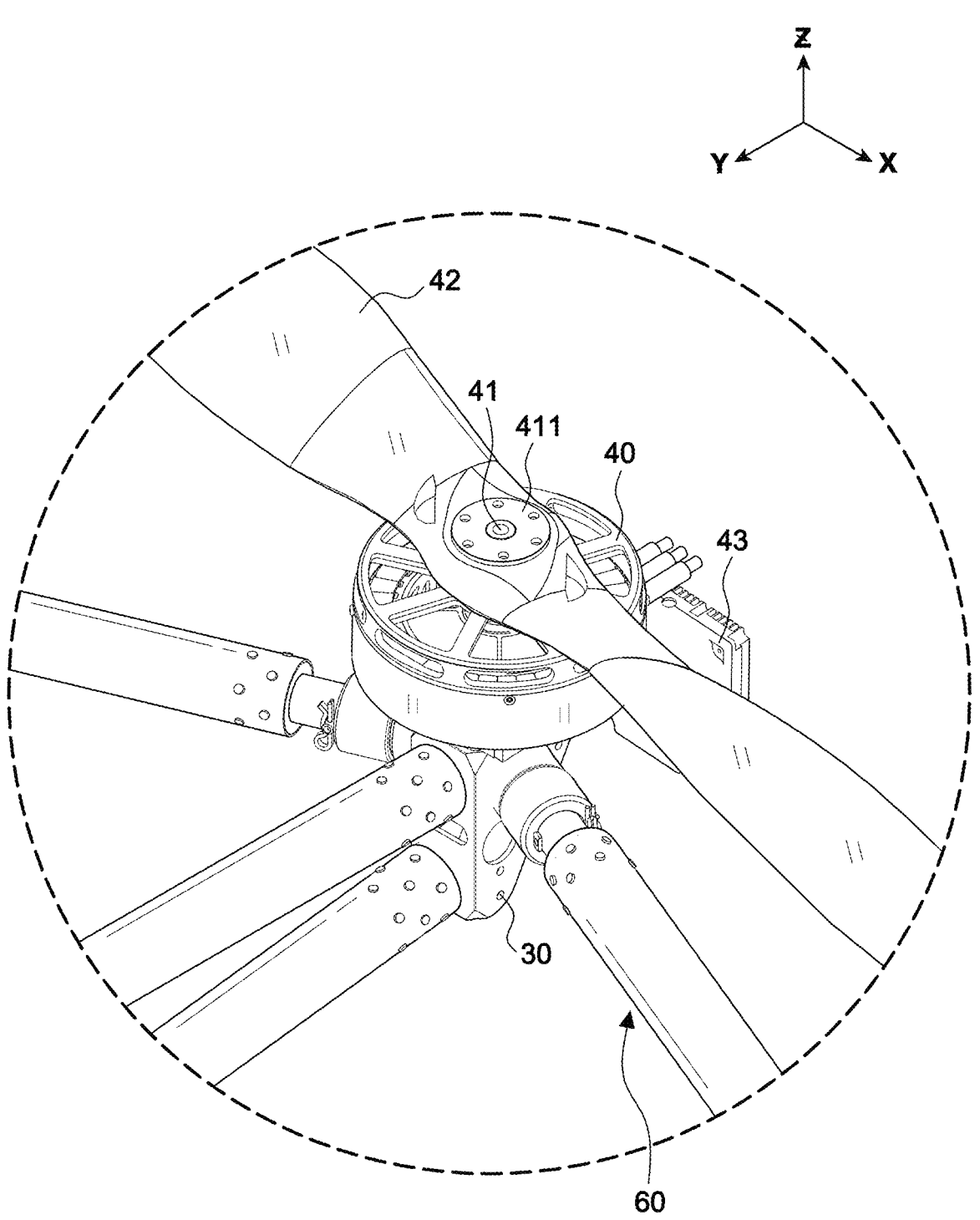
FIG. 7 is a zoom in view of the 7 in FIG. 6.

Referring to FIGS. 1~8, a preferred embodiment of the present invention, includes: a lower mount 10, a bottom surface 11 of the lower mount 10 is a horizontal surface, which is used to be combined with a body 30 of an aircraft 60, the top surface of the lower mount 10 is a joint surface 12, the joint surface 12 forms a first inclination ($\theta1$) from the back to the front and also forms a second inclination ($\theta2$) from the left and right sides, so that the joint surface 12 presents the inclination of the first and second directions at the same time, and a convex slide rail 13 is provided on both sides of the joint surface 12; in this embodiment, as FIG. 7 showing, the lower mount 10 is positioning on the body 30 by multiple screws 15.

An upper mount 20, the upper mount 20 is combined with the lower mount 10, a motor 40 of the aircraft 60 is combined with the upper mount 20, and the upper mount 20 has a concave slide groove 21 that can be combined with the convex slide rails 13 on the two sides of the lower mount 10, so that the upper mount 20 is embed and assembled on the joint surface 12 of the lower motor 10 from the rear side of the lower motor 10; and the side edges of the upper mount 20 and the lower mount 10 are respectively provided with corresponding latch through holes 22 and 14; moreover, the motor 40 is provided with a rotating shaft 41, and a rotary wing 42 is locked on the rotating shaft 41 through a combined cover 411. In addition, a control unit 43 is provided on the side of the motor 40 to control the start, stop and speed of the motor 40. However, the control unit 43 is a prior art and is not the subject of the present invention, so it will not be described in detail.

A latch 50 set through the latch through holes 22 and 14 to position the upper mount 20 above the lower mount 10.

3

Figure 8:
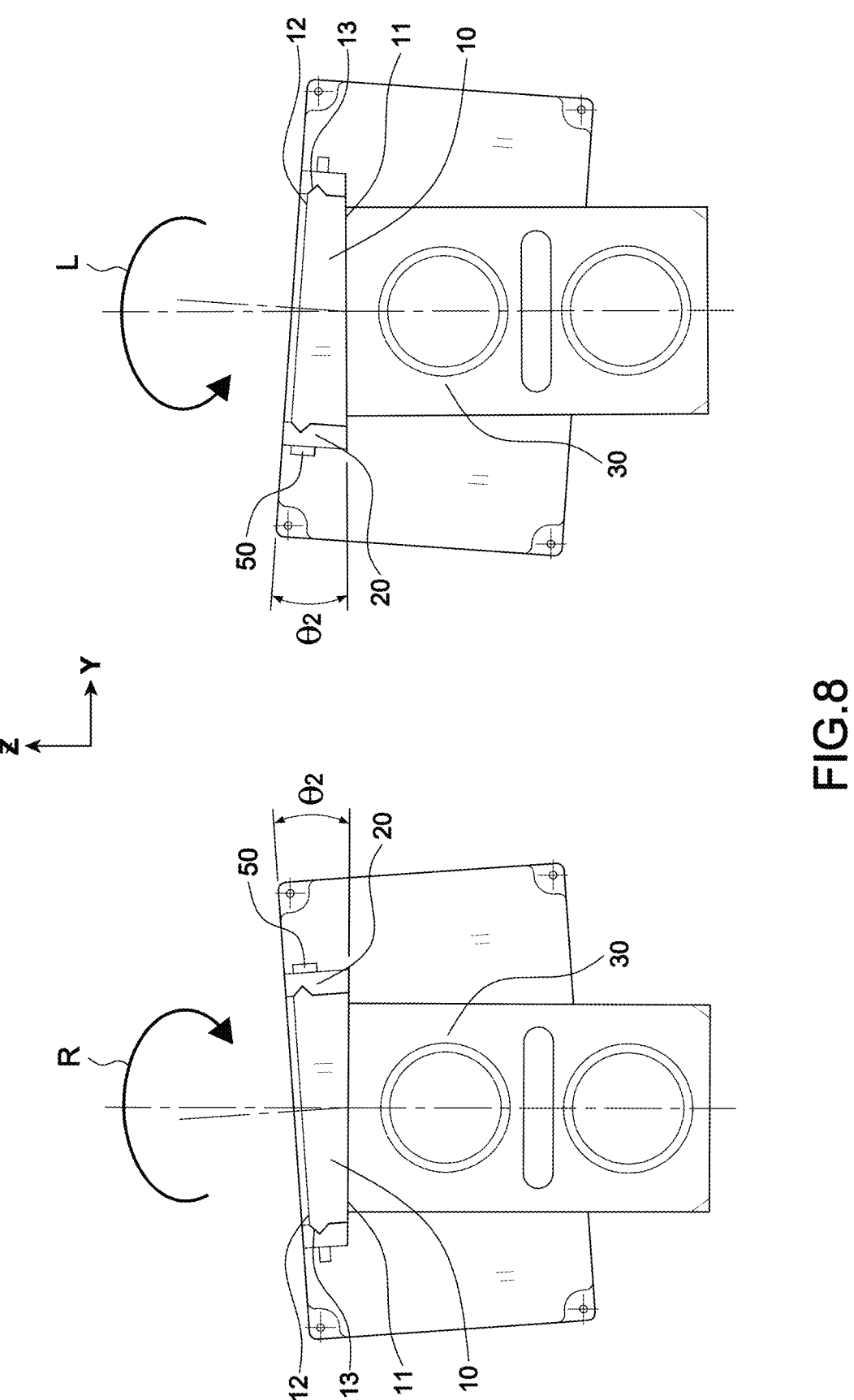
FIG. 8 is a schematic diagram illustrating the inclined state of adjacent lower mounts of the present invention.

Referring to FIGS. 6~8, a body 30 of the aircraft 60 is designed in polygonal shape, the lower mount 10 is provided at each end corner, and the left and right sides of each adjacent lower mount 10 are inclined in opposite directions, forming a staggered configuration in which one is inclined to the left and the other is inclined to the right.

In this embodiment, a body 30 of the aircraft 60 is designed in octagonal shape, provided with eight lower mounts 10, and the left and right sides of each adjacent lower mount 10 are inclined in opposite directions.

With the features disclosed above, the motor support of the present invention is designed as a separate lower mount 10 and upper mount 20. The upper mount 20 and the lower mount 10 are combined by the concave slide groove 21 and the convex slide rail 13, and then quickly combined and positioned by the latch through holes 22, 14 and the latch 50. Therefore, when the motor 40 needs to be changed, only requires removing the latch 50 to allow the upper mount 20 to slide away from the lower mount 10, and the motor 40 can be removed from the upper mount 20 for replacement without removing the lower mount 10 located on the body 30; When the inclination of the motor 40 needs to be adjusted and the lower mount 10 needs to be replaced, the latch 50 is removed to allow the upper mount 20 to slide away from the lower mount 10, and the lower mount 10 can be removed from the body 30 for replacement without removing the motor 40 located on the upper mount 20; Therefore, the present invention has the effect of making it more convenient to replace the motor or the motor mount.

Another important feature of the present invention is: the joint surface 12 of the lower mount 10 forms a first inclination ($\theta 1$) from the back to the front and also forms a second inclination ($\theta 2$), so that the joint surface 12 presents the inclination of the first and second directions at the same time; In other words, the joint surface 12 of the lower mount 10 is in a double-inclined shape. To achieve this feature, referring to FIGS. 6~8, the body 30 of the aircraft 60 is designed in octagonal shape, provided with eight motors 40, however, if each lower mount 10 has no inclination, when the motor 40 drives each rotary wing 42 to rotate, the adjacent motors 40 must rotate in opposite directions; therefore, if one of them rotates clockwise to the right (R), the rotation direction of the adjacent motor 40 must be counterclockwise to the left (L), so that the flight of the aircraft 60 can be balanced. Accordingly, as shown in FIG. 8, the inclined directions of the left and right sides of each adjacent lower mount 10 of the present invention are opposite. In this way, the rotating airflows of the rotary wing 42 rotating rightward (R) and leftward (L) will not interfere with each other. Since the lower mount 10 of the present invention is in a double-inclined shape, the overall flight airflow is smoother and more stable.

4

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A motor mount for a separate type motor of a large multicopter, comprising:
   a lower mount, a bottom surface of the lower mount is a horizontal surface, which is configured to be combined with a body of an aircraft, a top surface of the lower mount is a joint surface, the joint surface forms a first inclination from a back to a front and also forms a second inclination from a left to a right side of the joint surface, so that the joint surface presents an inclination of a first and a second direction at the same time, and a convex slide rail is provided on two sides of the joint surface;
   an upper mount, the upper mount is combined with the lower mount, a motor of the aircraft is combined with the upper mount, and the upper mount has a concave slide groove that can be combined with the convex slide rails on two sides of the lower mount, so that the upper mount is embedded and assembled on the joint surface of the lower mount from a rear side of the lower mount; and side edges of the upper mount and the side edges of the lower mount are respectively provided with corresponding latch through holes; and
   a latch set through the latch through holes to position the upper mount above the lower mount.

2. The motor mount for a separate type motor of a large multicopter, as claimed in claim 1, wherein a body of the aircraft is designed in a polygonal shape, the lower mount is provided at each end corner, and the left and right sides of each adjacent lower mount are inclined in opposite directions, forming a staggered configuration in which one is inclined to the left and the other is inclined to the right.

3. The motor mount for a separate type motor of a large multicopter, as claimed in claim 2, wherein a body of the aircraft is designed in an octagonal shape, provided with eight lower mounts, and the left and right sides of each adjacent lower mount are inclined in opposite directions.

4. The motor mount for a separate type motor of a large multicopter, as claimed in claim 1, wherein the lower mount is fixed on the body by a plurality of screws.

5. The motor mount for a separate type motor of a large multicopter, as claimed in claim 1, wherein the motor is provided with a rotating shaft, and a rotary wing is locked on the rotating shaft through a combined cover.

* * * * *